United States Patent
Li

(10) Patent No.: US 11,803,037 B2
(45) Date of Patent: Oct. 31, 2023

(54) CAMERA OPTICAL LENS

(71) Applicant: AAC Optics (Changzhou) Co., Ltd., Changzhou (CN)

(72) Inventor: Hongye Li, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 392 days.

(21) Appl. No.: 17/134,177

(22) Filed: Dec. 25, 2020

(65) Prior Publication Data

US 2022/0066158 A1   Mar. 3, 2022

(30) Foreign Application Priority Data

Aug. 25, 2020   (CN) .......................... 202010860007.6

(51) Int. Cl.
G02B 9/60 (2006.01)
G02B 13/00 (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

2016/0231534 A1*   8/2016   Tang .................. G02B 13/0045

* cited by examiner

*Primary Examiner* — Joseph P Martinez
(74) *Attorney, Agent, or Firm* — W&G Law Group

(57) ABSTRACT

A camera optical lens includes first to fifth lenses from an object side to an image side, the first, third, and fourth lenses having positive refractive power, the second and fifth lenses having negative refractive power, and satisfies: $-6.00 \leq f2/f \leq -3.00$; $-20.00 \leq (R7+R8)/(R7-R8) \leq -2.00$; and $1.60 \leq d2/d4 \leq 6.00$, where f denotes focal length of the camera optical lens, f2 denotes focal length of the second lens, R7 denotes central curvature radius of an object side surface of the fourth lens, R8 denotes central curvature radius of an image side surface of the fourth lens, d2 denotes on-axis distance from an image side surface of the first lens to an object side surface of the second lens, and d4 denotes on-axis distance from an image side surface of the second lens to an object side surface of the third lens, thereby having good optical performance while meeting design requirements of a wide angle and ultra-thinness.

10 Claims, 7 Drawing Sheets

CAMERA OPTICAL LENS

TECHNICAL FIELD

The present invention relates to the field of optical lenses, and more particularly, to a camera optical lens suitable for portable terminal devices such as smart phones and digital cameras, as well as camera devices such as monitors and PC lenses.

BACKGROUND

In recent years, with the popularity of smart phones, the demand for a miniaturized camera lens has increased. The photosensitive devices of a conventional camera lens are nothing more than charge coupled devices (CCD) or complementary metal-oxide semiconductor devices (CMOS Sensor). With the advancement of semiconductor manufacturing technology, the pixel size of the photosensitive device has become smaller and smaller, and nowadays electronic products are developing with good functions and thin and small appearance. Therefore, the miniaturized camera lens with good imaging quality has become the mainstream in the current market.

In order to obtain a better imaging quality, the camera lens traditionally mounted onto mobile phone cameras mostly adopts a structure including three lenses or four lenses. However, with the development of technology and increased diversified requirements from the users, in the situation where a pixel area of a photosensitive device gradually decreases and the requirement in the imaging quality gradually increases, camera lenses having five lenses have gradually appeared in lens design. Although the conventional camera lens including five lenses has a good optical performance, there is still some irrationality in terms of refractive power, a distance between lenses and a shape of the lenses. As a result, the lens structure cannot meet the design requirements of a wide angle and ultra-thinness while having good optical performance.

Therefore, it is necessary to provide a camera optical lens that has good optical performance while meeting the design requirements of a wide angle and ultra-thinness.

SUMMARY

A purpose of the present invention is to provide a camera optical lens, aiming to solve the problems of insufficient wide angle and ultra-thinness of the conventional camera optical lens.

The technical scheme of the present invention is as follows.

The present invention provides a camera optical lens, including five lens, which are, from an object side to an image side, a first lens having positive refractive power, a second lens having negative refractive power, a third lens having positive refractive power, a fourth lens having positive refractive power, and a fifth lens having negative refractive power. The camera optical lens satisfies following conditions: $-6.00 \leq f2/f \leq -3.00$; $-20.00 \leq (R7+R8)/(R7-R8) \leq -2.00$; and $1.60 \leq d2/d4 \leq 6.00$, where f denotes a focal length of the camera optical lens, f2 denotes a focal length of the second lens, R7 denotes a central curvature radius of an object side surface of the fourth lens, R8 denotes a central curvature radius of an image side surface of the fourth lens, d2 denotes an on-axis distance from an image side surface of the first lens to an object side surface of the second lens, and d4 denotes an on-axis distance from an image side surface of the second lens to an object side surface of the third lens.

In an improved embodiment, the camera optical lens further satisfies a following condition: $1.50 \leq (R9+R10)/(R9-R10) \leq 20.00$, where R9 denotes a central curvature radius of an object side surface of the fifth lens, and R10 denotes a central curvature radius of an image side surface of the fifth lens.

In an improved embodiment, the camera optical lens further satisfies following conditions: $0.78 \leq f1/f \leq 2.80$; $-5.88 \leq (R1+R2)/(R1-R2) \leq -1.55$; and $0.04 \leq d1/TTL \leq 0.16$, where f1 denotes a focal length of the first lens, R1 denotes a central curvature radius of an object side surface of the first lens, R2 denotes a central curvature radius of the image side surface of the first lens, d1 denotes an on-axis thickness of the first lens, and TTL is a total optical length from the object side surface of the first lens to an image plane of the camera optical lens along an optic axis.

In an improved embodiment, the camera optical lens further satisfies following conditions: $0.93 \leq (R3+R4)/(R3-R4) \leq 6.90$; and $0.03 \leq d3/TTL \leq 0.11$, where R3 denotes a central curvature radius of the object side surface of the second lens, R4 denotes a central curvature radius of the image side surface of the second lens, d3 denotes an on-axis thickness of the second lens, and TTL denotes a total optical length from an object side surface of the first lens to an image plane of the camera optical lens along an optic axis.

In an improved embodiment, the camera optical lens further satisfies following conditions: $0.65 \leq f3/f \leq 2.72$; $0.60 \leq (R5+R6)/(R5-R6) \leq 2.53$; and $0.06 \leq d5/TTL \leq 0.26$, where f3 denotes a focal length of the third lens, R5 denotes a central curvature radius of the object side surface of the third lens, R6 denotes a central curvature radius of an image side surface of the third lens, d5 denotes an on-axis thickness of the third lens, and TTL denotes a total optical length from an object side surface of the first lens to an image plane of the camera optical lens along an optic axis.

In an improved embodiment, the camera optical lens further satisfies following conditions: $1.17 \leq f4/f \leq 21.33$; and $0.04 \leq d7/TTL \leq 0.17$, where f4 denotes a focal length of the fourth lens, d7 denotes an on-axis thickness of the fourth lens, and TTL denotes a total optical length from an object side surface of the first lens to an image plane of the camera optical lens along an optic axis In an improved embodiment, the camera optical lens further satisfies following conditions: $-978.40 \leq f5/f \leq -0.58$; and $0.04 \leq d9/TTL \leq 0.15$, where f5 denotes a focal length of the fifth lens, d9 denotes an on-axis thickness of the fifth lens, and TTL denotes a total optical length from an object side surface of the first lens to an image plane of the camera optical lens along an optic axis.

In an improved embodiment, the camera optical lens further satisfies a following condition: $TTL/IH \leq 1.25$, where IH denotes an image height of the camera optical lens, and TTL denotes a total optical length from an object side surface of the first lens to an image plane of the camera optical lens along an optic axis.

In an improved embodiment, the camera optical lens further satisfies a following condition: $FOV \geq 94°$, where FOV denotes a field of view of the camera optical lens.

In an improved embodiment, the camera optical lens further satisfies a following condition: $FNO \leq 2.10$, where FNO denotes an F number of the camera optical lens.

The beneficial effects of the present invention are a follows.

The camera optical lens provided by the present invention has good optical performance, satisfies the design requirements of a wide angle and ultra-thinness, and is especially suitable for the mobile phone camera lens assembly and the WEB camera lens composed of imaging elements such as CCD and CMOS for high pixels.

BRIEF DESCRIPTION OF DRAWINGS

In order to more clearly illustrate technical solutions in embodiments of the present invention, the accompanying drawings used in the embodiments are briefly introduced as follows. It should be noted that the drawings described as follows are merely part of the embodiments of the present invention, and other drawings can also be acquired by those skilled in the art without paying creative efforts.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figures and the embodiments. It should be understood the specific embodiments described hereby is only to explain the invention, not intended to limit the invention.

Embodiment 1

Figure 1:
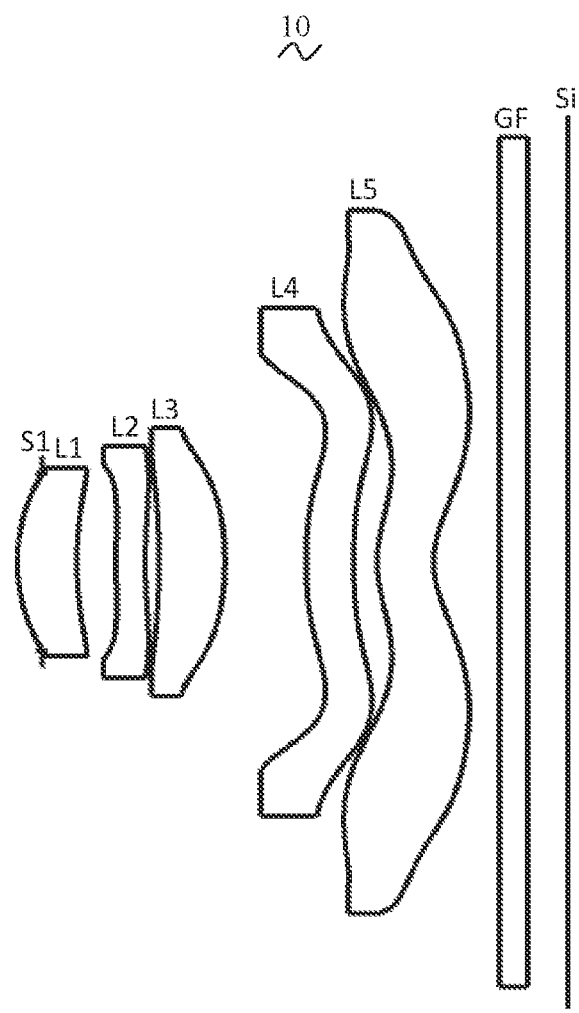
FIG. 1 is a schematic structural diagram of a camera optical lens according to Embodiment 1.

Please refer to FIG. 1 to FIG. 4, Embodiment 1 of the present invention provides a camera optical lens 10. As shown in FIG. 1, a left side is an object side, and a right side is an image side. The camera optical lens 10 mainly includes five lenses, which are, from the object side to the image side, an aperture S1, a first lens L1, a second lens L2, a third lens L3, a fourth lens L4, and a fifth lens L5. An optical filter (GF) or a glass plate may be provided between the fifth lens L5 and an image plane Si.

In this embodiment, the first lens L1 is made of a plastic material, the second lens L2 is made of a plastic material, the third lens L3 is made of a plastic material, the fourth lens L4 is made of a plastic material, and the fifth lens L5 is made of a plastic material. In other embodiments, the lenses may be made of other materials.

In this embodiment, the first lens L1 has a positive refractive power, the second lens L2 has a negative refractive power, the third lens L3 has a positive refractive power, the fourth lens L4 has a positive refractive power, and the fifth lens L5 has a negative refractive power.

In this embodiment, it is defined that a focal length of the camera optical lens 10 is f, a focal length of the second lens L2 is f2, an on-axis distance from an image side surface of the first lens L1 to an object side surface of the second lens L2 is d2, an on-axis distance from an image side surface of the second lens L2 to an object side surface of the third lens L3 is d4, a central curvature radius of an object side surface of the fourth lens L4 is R7, a central curvature radius of an image side surface of the four lens L4 is R8, and the camera optical lens satisfies the following conditions:

$$-6.00 \leq f2/f \leq -3.00 \tag{1}$$

$$-20.00 \leq (R7+R8)/(R7-R8) \leq -2.00 \tag{2}$$

$$1.60 \leq d2/d4 \leq 6.00 \tag{3}$$

Herein, the condition (1) specifies a ratio of the focal length of the second lens to the focal length of the camera optical lens, which can effectively balance spherical aberration and field curvature of the system.

The condition (2) specifies a shape of the fourth lens. Within a range defined by this condition, it is beneficial to alleviate a degree of deflection of light passing through the lens and effectively reduce aberration.

The condition (3) specifies a ratio of an air gap between the first and second lenses to an air gap between the second and third lenses. Within a range defined by this condition, it is beneficial to reduce the total optical length and achieve ultra-thinness.

It is defined that a central curvature radius of an object side surface of the fifth lens L5 is R9, a central curvature radius of an image side surface of the fifth lens L5 is R10, and the camera optical lens further satisfies the following condition: $1.50 \leq (R9+R10)/(R9-R10) \leq 20.00$, which specifies a shape of the fifth lens. Within a range defined by this condition, with the development of ultra-thinness and wide-angle, it is beneficial to correct off-axis aberration.

In this embodiment, an object side surface of the first lens L1 is convex surface at a paraxial position, and an image side surface of the first lens L1 is a concave surface at a paraxial position.

It is defined that a focal length of the camera optical lens 10 is f, a focal length of the first lens L1 is f1, and the camera optical lens further satisfies the following condition: $0.78 \leq f1/f \leq 2.80$, which specifies a ratio of the focal length of the first lens to the focal length of the camera optical lens. Within a range defined by this condition, the first lens has an appropriate positive refractive power, which is beneficial to reduce aberration of the system while achieving ultra-thinness and a wide angle of the camera optical lens. As an example, the camera optical lens further satisfies the following condition: $1.24 \leq f1/f \leq 2.24$ is satisfied.

A central curvature radius of an object side surface of the first lens L1 is R1, a central curvature radius of an image side surface of the first lens L1 is R2, and the camera optical lens further satisfies the following condition: $-5.88 \leq (R1+R2)/(R1-R2) \leq -1.55$. By reasonably controlling a shape of the first lens L1, the first lens L1 can effectively correct spherical aberration of the system. As an example, the camera optical lens further satisfies the following condition: $-3.68 \leq (R1+R2)/(R1-R2) \leq -1.94$.

An on-axis thickness of the first lens L1 is d1, a total optical length from the object side surface of the first lens to the image plane of the camera optical lens 10 along an optic axis is TTL, and the camera optical lens further satisfies the following condition: $0.04 \leq d1/TTL \leq 0.16$. Within a range defined by this condition, it is beneficial to achieve ultra-thinness. As an example, the camera optical lens further satisfies the following condition: $0.07 \leq d1/TTL \leq 0.13$.

In this embodiment, an object side surface of the second lens L2 is a convex surface at a paraxial position, and an image side surface of the second lens L2 is a concave surface at a paraxial position.

It is defined that a central curvature radius of an object side surface of the second lens L2 is R3, a central curvature radius of an image side surface of the second lens L2 is R4, and the camera optical lens further satisfies the following condition: $0.93 \leq (R3+R4)/(R3-R4) \leq 6.90$, which specifies a shape of the second lens L2. Within a range defined by this condition, with the development of ultra-thinness and wide angle of the camera optical lens, it is beneficial to correct longitudinal aberration. As an example, the camera optical lens further satisfies the following condition: $1.48 \leq (R3+R4)/(R3-R4) \leq 5.52$.

An on-axis thickness of the second lens L2 is d3, the total optical length from the object side surface of the first lens to the image plane of the camera optical lens 10 along the optic axis is TTL, and the camera optical lens further satisfies the following condition: $0.03 \leq d3/TTL \leq 0.11$. Within a range defined this condition, it is beneficial to achieve ultra-thinness. As an example, the camera optical lens further satisfies the following condition: $0.04 \leq d3/TTL \leq 0.08$.

In this embodiment, an object side surface of the third lens L3 is a concave surface at a paraxial position, and an image side surface of the third lens is a convex surface at a paraxial position.

It is defined that a focal length of the third lens L3 is f3, a focal length of the camera optical lens 10 is f, and the camera optical lens further satisfies the following condition: $0.65 \leq f3/f \leq 2.72$. Reasonable power allocation enables the system to have better imaging quality and lower sensitivity. As an example, the camera optical lens further satisfies the following condition: $1.04 \leq f3/f \leq 2.18$.

A central curvature radius of an object side surface of the third lens L3 is R5, a central curvature radius of an image side surface of the third lens L3 is R6, and the camera optical lens further satisfies the following condition: $0.60 \leq (R5+R6)/(R5-R6) \leq 2.53$, which specifies a shape of the third lens. Within a range defined by the condition, it is beneficial to alleviate a degree of deflection of light passing through the lens and effectively reducing aberration. As an example, the camera optical lens further satisfies the following condition: $0.96 \leq (R5+R6)/(R5-R6) \leq 2.02$.

An on-axis thickness of the third lens L3 is d5, the total optical length from the object side surface of the first lens to the image plane of the camera optical lens 10 along the optic axis is TTL, and the camera optical lens further satisfies the following condition: $0.06 \leq d5/TTL \leq 0.26$. Within a range defined by this condition, it is beneficial to achieve ultra-thinness. As an example, the camera optical lens further satisfies the following condition: $0.10 \leq d5/TTL \leq 0.21$.

In this embodiment, an object side surface of the fourth lens L4 is a convex surface at a paraxial position, and an image side surface of the fourth lens L4 is a concave surface at a paraxial position.

It is defined that a focal length of the fourth lens L4 is f4, a focal length of the camera optical lens 10 is f, and the camera optical lens further satisfies the following condition: $1.17 \leq f4/f \leq 21.33$, which specifies a ratio of the focal length of the fourth lens to the focal length of the system. Within a range defined by this condition, it is beneficial to improve the performance of the optical system. As an example, the camera optical lens further satisfies the following condition: $1.87 \leq f4/f \leq 17.06$.

An on-axis thickness of the fourth lens L4 is d7, the total optical length from the object side surface of the first lens to the image plane of the camera optical lens 10 along the optic axis is TTL, and the camera optical lens further satisfies the following condition: $0.04 \leq d7/TTL \leq 0.17$. Within a range defined by this condition, it is beneficial to achieve ultra-thinness. As an example, the camera optical lens further satisfies the following condition: $0.07 \leq d7/TTL \leq 0.13$.

In this embodiment, an object side surface of the fifth lens L5 is a convex surface at a paraxial position, and an image side surface of the fifth L5 is a concave surface at a paraxial position.

It is defined that a focal length of the fifth lens L5 is f5, a focal length of the camera optical lens is f, and the camera optical lens further satisfies the following condition: $-978.40 \leq f5/f \leq -0.58$. The limitation on the fifth lens L5 can effectively smooth a light angle of the camera lens and reduce tolerance sensitivity. As an example, the camera optical lens further satisfies the following condition: $-611.50 \leq f5/f \leq -0.73$.

An on-axis thickness of the fifth lens L5 is d9, and the total optical length from the object side surface of the first lens to the image plane of the camera optical lens 10 along the optic axis is TTL, and the camera optical lens further satisfies the following condition: $0.04 \leq d9/TTL \leq 0.15$. Within a range defined by this condition, it is beneficial to achieve ultra-thinness. As an example, the camera optical lens further satisfies the following condition: $0.06 \leq d9/TTL \leq 0.12$.

In this embodiment, an F number of the camera optical lens 10 is FNO, which is smaller than or equal to 2.10, so that a large aperture can be achieved.

In this embodiment, a field of view of the camera optical lens 10 is FOV, which is larger than or equal to 94°, so that a wide angle can be achieved.

In this embodiment, the total optical length from the object side surface of the first lens to the image plane of the camera optical lens 10 along the optic axis is TTL, an image height of the camera optical lens 10 is IH, and the camera optical lens further satisfies the following condition: $TTL/IH \leq 1.25$, so that ultra-thinness can be achieved.

When the focal length of the camera optical lens 10, the focal length and the central curvature radius of the respective lenses according to the present invention satisfy the above conditions, the camera optical lens 10 can have good optical performance, and meet the design requirements of a large aperture, a wide angle, and ultra-thinness. Based on the characteristics of the camera optical lens 10, the camera optical lens 10 is especially suitable for the mobile phone camera lens assembly and the WEB camera lens composed of imaging elements such as CCD and CMOS for high pixels.

In addition, in the camera optical lens 10 provided by this embodiment, the surfaces of the respective lenses can be designed as aspherical surfaces, and the aspherical surface can be easily made into a shape other than a spherical surface to obtain more control variables, thereby eliminating and reducing aberration and reducing the number of lenses used. Therefore, the overall length of the camera optical lens 10 can be effectively reduced. In this embodiment, the object side surface and the image side surface of each of the lenses are aspherical surfaces.

It should be noted that, since the first lens L1, the second lens L2, the third lens L3, the fourth lens L4, and the fifth lens L5 have the aforementioned structures and parameter relationships, the camera optical lens 10 can reasonably allocate the refractive power, distances and shapes of the respective lenses, thereby correcting various aberrations.

The camera optical lens 10 of the present invention will be described in the following by examples. The symbols described in each example are as follows. The focal length, the on-axis distance, the central curvature radius, the on-axis thickness, the inflection point position, and stagnation point position are all expressed in units of mm.

TTL: a total optical length (an on-axis distance from the object side surface of the first lens L1 to the image surface Si along the optic axis), with a unit of mm.

FNO: F number (a ratio of an effective focal length of the camera optical lens to an entrance pupil diameter).

In addition, at least one of the object side surface and the image side surface of each lens may also be provided with an inflection point and/or a stagnation point to meet high-quality imaging requirements. For specific implementation manners, please refer to the following description.

FIG. 1 shows design data of the camera optical lens 10.

For the first lens L1 to the optical filter GF constituting the camera optical lens 10 according to Embodiment 1 of the present invention, the central curvature radius R of the object side surface and the central curvature radius R of the image side surface of each lens, the on-axis thickness of each lens, the distance d between two adjacent lenses, the refractive index nd and the abbe number vd are listed in Table 1. It should be noted that in this embodiment, R and d are both expressed in units of millimeters (mm).

TABLE 1

| | R | d | | nd | | vd |
|---|---|---|---|---|---|---|
| S1 | ∞ | d0 = | −0.186 | | | |
| R1 | 1.538 | d1 = | 0.450 | nd1 | 1.5444 | v1 55.82 |
| R2 | 3.211 | d2 = | 0.298 | | | |
| R3 | 9.322 | d3 = | 0.220 | nd2 | 1.6613 | v2 20.37 |
| R4 | 4.587 | d4 = | 0.102 | | | |
| R5 | −10.152 | d5 = | 0.500 | nd3 | 1.6074 | v3 56.65 |
| R6 | −2.594 | d6 = | 0.614 | | | |
| R7 | 3.846 | d7 = | 0.362 | nd4 | 1.6359 | v4 23.82 |
| R8 | 5.330 | d8 = | 0.177 | | | |
| R9 | 1.087 | d9 = | 0.426 | nd5 | 1.6153 | v5 25.94 |
| R10 | 0.759 | d10 = | 0.500 | | | |
| R11 | ∞ | d11 = | 0.210 | ndg | 1.5168 | vg 64.17 |
| R12 | ∞ | d12 = | 0.308 | | | |

The symbols used in the above table are explained as follows.

S1: aperture;
R: central curvature radius at a center of an optical surface;

R1: central curvature radius of an object side surface of a first lens L1;
R2: central curvature radius of an image side surface of the first lens L1;
R3: central curvature radius of an object side surface of a second lens L2;
R4: central curvature radius of an image side surface of the second lens L2;
R5: central curvature radius of an object side surface of a third lens L3;
R6: central curvature radius of an image side surface of the third lens L3;
R7: central curvature radius of an object side surface of a fourth lens L4;
R8: central curvature radius of an image side surface of the fourth lens L4;
R9: central curvature radius of an object side surface of a fifth lens L5;
R10: central curvature radius of an image side surface of the fifth lens L5;
R11: central curvature radius of an object side surface of an optical filter GF;
R12: central curvature radius of an image side surface of the optical filter GF;
d: on-axis thickness of a lens, on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the optical filter GF;
d11: on-axis thickness of optical filter GF;
d12: on-axis distance from the image side surface of the optical filter GF to the image plane;
nd: refractive index of d-line;
nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of d-line of the fifth lens L5;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

Table 2 shows the aspherical surface data of the respective lenses in the camera optical lens 10 according to Embodiment 1 of the present invention.

TABLE 2

| | Cone coefficient | Aspherical coefficient | | | | |
|---|---|---|---|---|---|---|
| | k | A4 | A6 | A8 | A10 | A12 |
| R1 | 1.9242E+00 | −1.0939E−01 | 9.8433E−01 | −1.0117E+01 | 5.9216E+01 | −2.1778E+02 |
| R2 | 1.1448E+01 | −4.8863E−02 | 1.0701E−01 | −2.1354E+00 | 1.4530E+01 | −6.0004E+01 |
| R3 | −2.7660E+01 | −1.8952E−01 | 2.1983E−01 | −2.1485E+00 | 7.1300E+00 | −1.5203E+01 |
| R4 | 6.9662E+00 | −1.5141E−01 | 1.7823E−01 | −5.6823E−01 | 7.9169E−01 | −3.4547E−01 |
| R5 | 3.5335E+01 | −7.8799E−02 | −7.5430E−02 | 7.1400E−01 | −1.4206E+00 | 5.5813E−01 |
| R6 | 6.7409E−01 | −9.2378E−02 | −2.1947E−01 | 9.3621E−01 | −2.6883E+00 | 5.4613E+00 |
| R7 | 3.4570E+00 | 2.0213E−01 | −3.9623E−01 | 3.9965E−01 | −3.5399E−01 | 2.2201E−01 |
| R8 | 3.4601E+00 | 1.0253E−01 | 1.6169E−02 | −2.5522E−01 | 2.8495E−01 | −1.6968E−01 |
| R9 | −1.4665E+00 | −6.4490E−02 | 5.2496E−01 | −3.1170E−01 | 1.2962E−01 | −3.5453E−02 |
| R10 | −3.3391E+00 | −2.9792E−01 | 2.5410E−01 | −1.6016E−01 | 6.9277E−02 | −1.9454E−02 |

| | Cone coefficient | Aspherical coefficient | | | |
|---|---|---|---|---|---|
| | k | A14 | A16 | A18 | A20 |
| R1 | 1.9242E+00 | 5.0376E+02 | −7.1347E+02 | 5.6501E+02 | −1.9200E+02 |
| R2 | 1.1448E+01 | 1.4982E+02 | −2.2420E+02 | 1.8432E+02 | −6.4193E+01 |
| R3 | −2.7660E+01 | 1.8583E+01 | −1.1478E+01 | 7.4089E−01 | 2.4559E+00 |
| R4 | 6.9662E+00 | −8.0908E−01 | 1.8870E+00 | −1.7156E+00 | 6.1859E−01 |
| R5 | 3.5335E+01 | 2.8179E+00 | −5.1729E+00 | 3.5568E+00 | −9.0031E−01 |
| R6 | 6.7409E−01 | −7.2643E+00 | 5.9576E+00 | −2.6653E+00 | 4.9135E−01 |
| R7 | 3.4570E+00 | −8.9243E−02 | 2.0281E−02 | −1.9960E−03 | 1.9194E−05 |
| R8 | 3.4601E+00 | 6.0623E−02 | −1.2792E−02 | 1.4630E−03 | −6.9830E−05 |
| R9 | −1.4665E+00 | 6.2128E−03 | −6.7239E−04 | 4.1005E−05 | −1.0798E−06 |
| R10 | −3.3391E+00 | 3.4341E−03 | −3.6593E−04 | 2.1479E−05 | −5.3337E−07 |

In Table 2, k represents a cone coefficient, and A4, A6, A8, A10, A12, A14, A16, A18, and A20 represents aspherical surface coefficients.

$$y = (x^2/R)/\{1+[1-(k+1)(x^2/R^2)]^{1/2}\} + A4x^4 + A6x^6 + A8x^8 + A10x^{10} + A12x^{12} + A14x^{14} + A16x^{16} + A18x^{18} + A20x^{20} \quad (4)$$

In the equation (4), x represents a vertical distance between a point on an aspherical curve and an optic axis, and y represents an aspherical depth (a vertical distance between a point on the aspherical surface that is distanced from the optic axis by x and a surface tangent to a vertex of the aspherical surface on the optic axis).

For convenience, the aspherical surface of each lens adopts the aspherical surface shown in the above equation (4). However, the present invention is not limited to the aspherical surface polynomial form expressed by the equation (4).

Table 3 and Table 4 show the design data of the inflection point and the stagnation point of each lens in the camera optical lens 10 according to this embodiment. Herein, P1R1 and P1R2 respectively represent the object side surface and the image side surface of the first lens L1; P2R1 and P2R2 respectively represent the object side surface and the image side surface of the second lens L2; P3R1 and P3R2 respectively represent the object side surface and the image side surface of the third lens L3; P4R1 and P4R2 respectively represent the object side surface and the image side surface of the fourth lens L4; and P5R1 and P5R2 respectively represent the object side surface and the image side surface of the fifth lens L5. The data in the "inflection point position" column is a vertical distance from the inflection point set on a surface of each lens to the optic axis of the camera optical lens 10. The data in the "stagnation point position" column is a vertical distance from the stagnation point set on a surface of each lens to the optic axis of the camera optical lens 10.

TABLE 3

| | Number of inflection points | Inflection point position 1 | Inflection point position 2 | Inflection point position 3 |
|---|---|---|---|---|
| P1R1 | 0 | / | / | / |
| P1R2 | 1 | 0.625 | / | / |
| P2R1 | 1 | 0.225 | / | / |
| P2R2 | 2 | 0.405 | 0.895 | / |
| P3R1 | 1 | 0.695 | / | / |
| P3R2 | 1 | 0.915 | / | / |
| P4R1 | 2 | 0.745 | 1.545 | / |
| P4R2 | 3 | 0.805 | 1.645 | 2.085 |
| P5R1 | 3 | 0.385 | 1.455 | 2.515 |
| P5R2 | 3 | 0.475 | 2.255 | 2.625 |

TABLE 4

| | Number of stagnation points | Stagnation point position 1 | Stagnation point position 2 | Stagnation point position 3 |
|---|---|---|---|---|
| P1R1 | 0 | / | / | / |
| P1R2 | 0 | / | / | / |
| P2R1 | 1 | 0.365 | / | / |
| P2R2 | 1 | 0.665 | / | / |
| P3R1 | 1 | 0.965 | / | / |
| P3R2 | 0 | / | / | / |
| P4R1 | 1 | 1.075 | / | / |
| P4R2 | 1 | 1.155 | / | / |
| P5R1 | 3 | 0.785 | 2.125 | 2.625 |
| P5R2 | 1 | 1.235 | / | / |

In addition, the values corresponding to the various parameters and the parameters already specified in the conditions in Embodiments 1-3 are listed in Table 13.

As shown in Table 13, Embodiment 1 satisfies the respective conditions.

Figure 2:
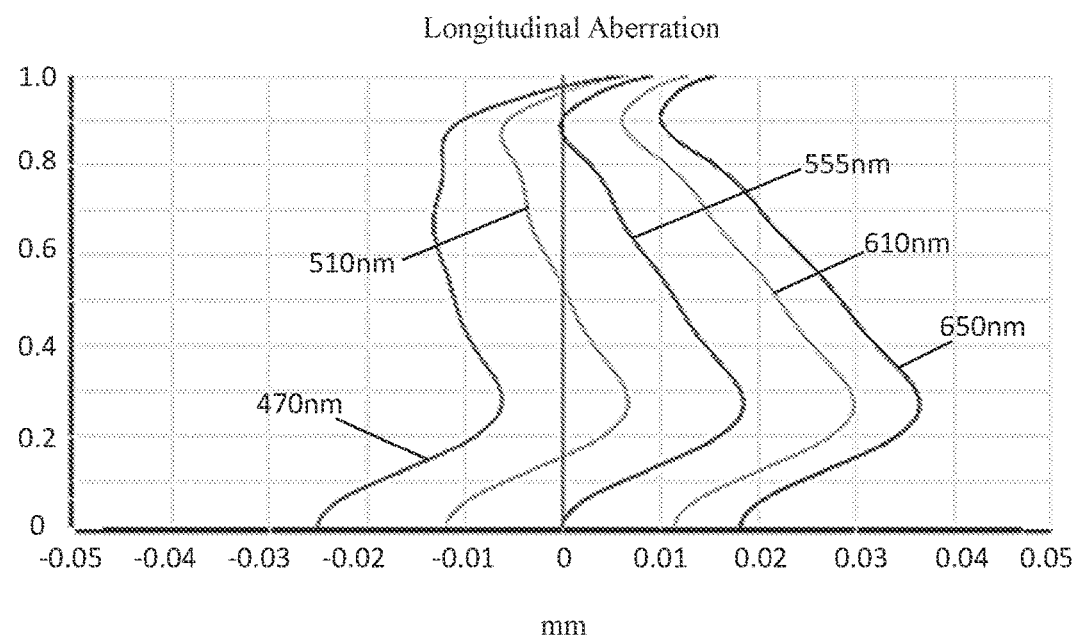
FIG. 2 is a schematic diagram of longitudinal aberration of the camera optical lens shown in FIG. 1.
Figure 3:
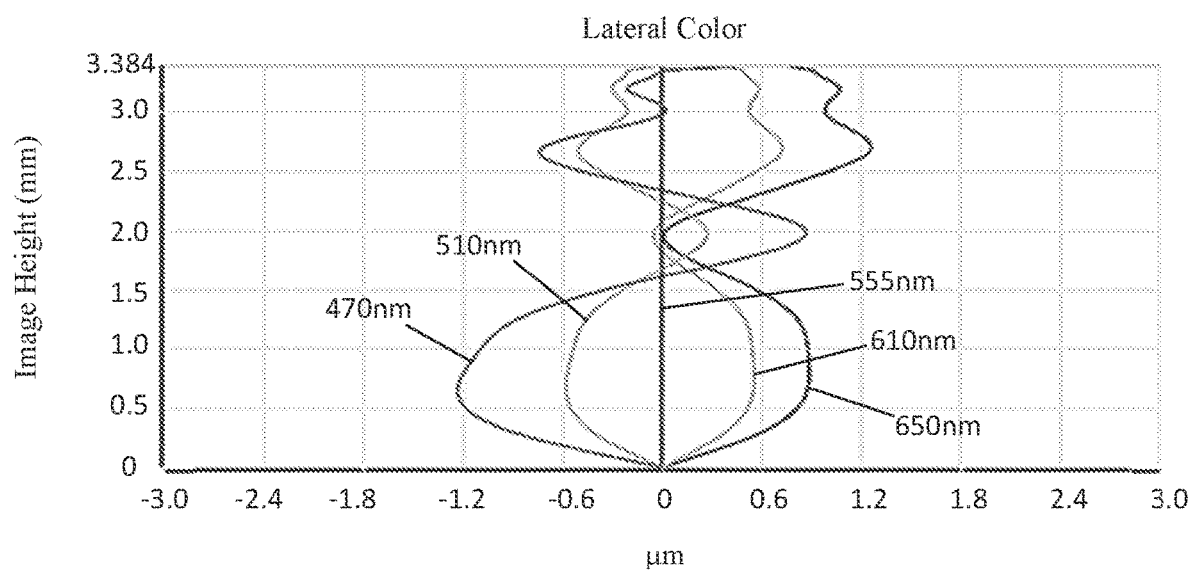
FIG. 3 is a schematic diagram of lateral color of the camera optical lens shown in FIG. 1.
Figure 4:
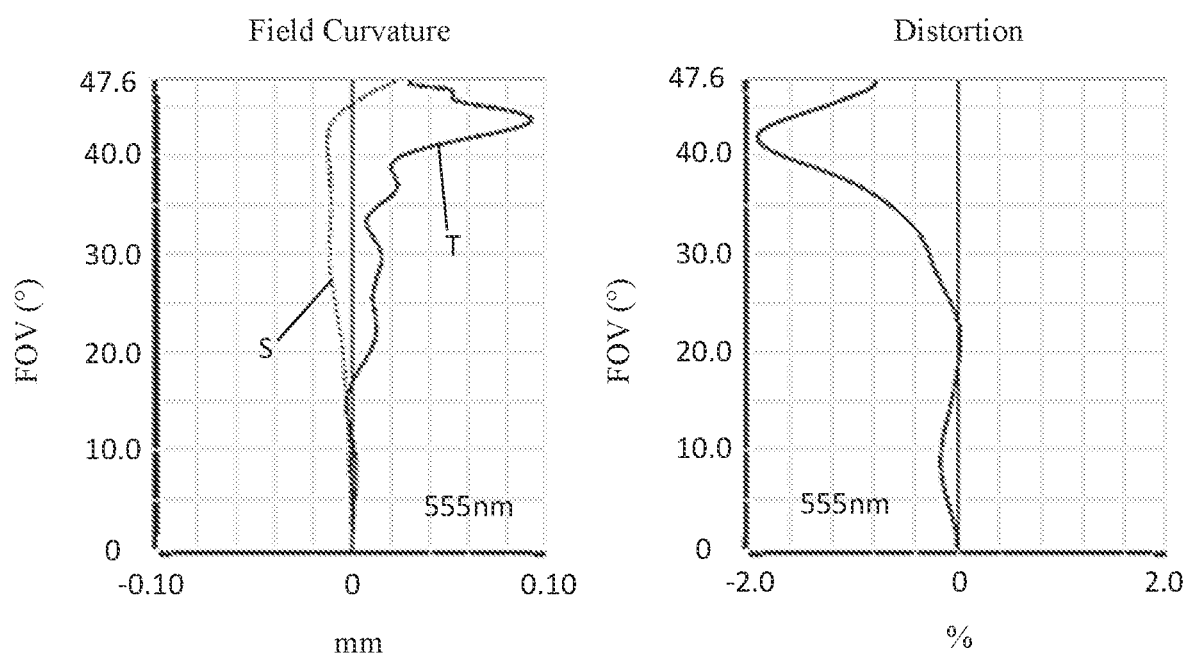
FIG. 4 is a schematic diagram of field curvature and distortion of the camera optical lens shown in FIG. 1.

FIG. 2 and FIG. 3 respectively show schematic diagrams of longitudinal aberration and lateral color of light having wavelengths of 650 nm, 610 nm, 555 nm, 510 nm, and 470 nm after passing through the camera optical lens 10. FIG. 4 shows a schematic diagram of field curvature and distortion of light having a wavelength of 555 nm after passing through the camera optical lens 10. In FIG. 4, the field curvature S is the field curvature in a sagittal direction, and the field curvature T is the field curvature in a meridian direction.

In this embodiment, an entrance pupil diameter ENPD of the camera optical lens 10 is 1.478 mm, the full field of view image height IH is 3.384 mm, and the FOV in a diagonal direction is 95.20°, so that the camera optical lens 10 can meet the design requirements of a wide angle and ultra-thinness. The longitudinal and lateral color aberrations are fully corrected, and the camera optical lens 10 has excellent optical performance.

Embodiment 2

Figure 5:
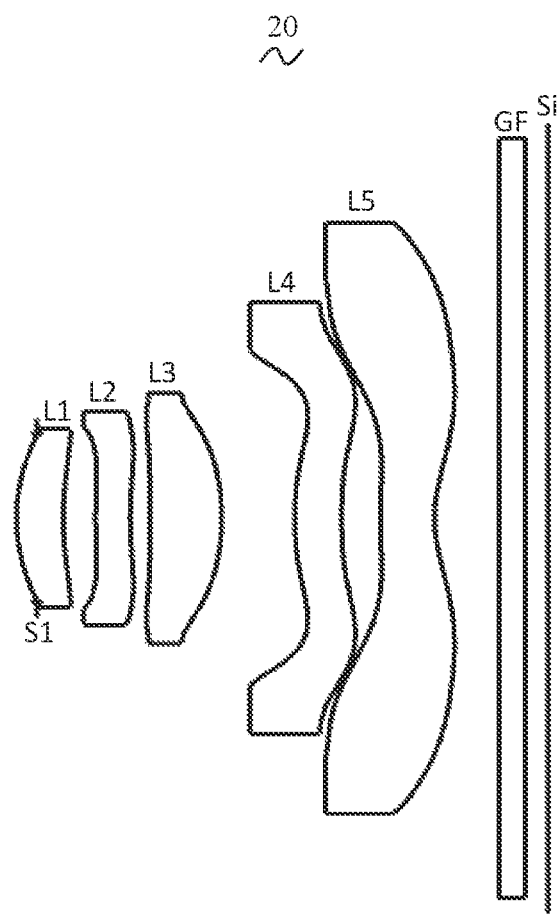
FIG. 5 is a schematic structural diagram of a camera optical lens according to Embodiment 2.

FIG. 5 is a schematic structural diagram of a camera optical lens 20 according to Embodiment 2. Embodiment 2 is basically the same as Embodiment 1. The symbols listed in the following tables have the same representation as Embodiment 1, so the same part will not be repeated herein, and only the difference from Embodiment 1 will be described in the following.

Table 5 and Table 6 show the design data of the camera optical lens 20 according to Embodiment 2 of the present invention.

TABLE 5

|     | R       | d          | nd   |        | vd   |       |
|-----|---------|------------|------|--------|------|-------|
| S1  | ∞       | d0 = −0.160|      |        |      |       |
| R1  | 1.715   | d1 = 0.368 | nd1  | 1.5444 | v1   | 55.82 |
| R2  | 3.481   | d2 = 0.250 |      |        |      |       |
| R3  | 6.507   | d3 = 0.273 | nd2  | 1.6613 | v2   | 20.37 |
| R4  | 4.183   | d4 = 0.153 |      |        |      |       |
| R5  | −25.392 | d5 = 0.560 | nd3  | 1.6074 | v3   | 56.65 |
| R6  | −2.243  | d6 = 0.570 |      |        |      |       |
| R7  | 3.126   | d7 = 0.368 | nd4  | 1.6359 | v4   | 23.82 |
| R8  | 9.257   | d8 = 0.301 |      |        |      |       |
| R9  | 6.103   | d9 = 0.422 | nd5  | 1.6153 | v5   | 25.94 |
| R10 | 1.279   | d10 = 0.500|      |        |      |       |
| R11 | ∞       | d11 = 0.210| ndg  | 1.5168 | vg   | 64.17 |
| R12 | ∞       | d12 = 0.180|      |        |      |       |

Table 6 shows the aspherical surface data of the respective lenses in the camera optical lens 20 according to Embodiment 2 of the present invention.

TABLE 6

| | Cone coefficient | Aspherical coefficient | | | | |
|---|---|---|---|---|---|---|
| | k | A4 | A6 | A8 | A10 | A12 |
| R1  | 2.0304E+00  | −9.5511E−02 | 6.9334E−01  | −7.0999E+00 | 4.2053E+01  | −1.5652E+02 |
| R2  | 9.6049E+00  | −6.9244E−02 | −1.4349E−01 | 7.8004E−01  | −3.7721E+00 | 1.1323E+01  |
| R3  | −6.8092E+01 | −1.7720E−01 | −4.1031E−01 | 3.2528E+00  | −2.0930E+01 | 8.0371E+01  |
| R4  | −1.6109E+01 | −1.3289E−01 | 1.8303E−03  | −2.8593E−01 | 1.2030E+00  | −3.6198E+00 |
| R5  | 9.9000E+01  | −2.1305E−02 | −2.0136E−01 | 9.4597E−01  | −2.4541E+00 | 3.5744E+00  |
| R6  | −6.2396E−01 | −4.9585E−02 | −3.3879E−01 | 1.3579E+00  | −3.5554E+00 | 6.4064E+00  |
| R7  | 2.9339E+00  | 1.4878E−01  | −4.5373E−01 | 4.1443E−01  | −3.0304E−01 | 1.0133E−01  |
| R8  | 1.9442E+01  | 3.7718E−01  | −6.2497E−01 | 4.4297E−01  | −1.7445E−01 | 1.8184E−02  |
| R9  | 4.1732E+00  | −2.1516E−01 | −6.2208E−03 | 1.0118E−01  | −7.2946E−02 | 2.9391E−02  |
| R10 | −5.9945E+00 | −1.8170E−01 | 1.2585E−01  | −8.1038E−02 | 4.2867E−02  | −1.5274E−02 |

| | Cone coefficient | Aspherical coefficient | | | |
|---|---|---|---|---|---|
| | k | A14 | A16 | A18 | A20 |
| R1  | 2.0304E+00  | 3.6596E+02  | −5.2243E+02 | 4.1570E+02  | −1.4139E+02 |
| R2  | 9.6049E+00  | −2.3260E+01 | 3.0625E+01  | −2.3746E+01 | 7.9387E+00  |
| R3  | −6.8092E+01 | −1.9343E+02 | 2.8386E+02  | −2.3235E+02 | 8.0725E+01  |
| R4  | −1.6109E+01 | 6.8988E+00  | −7.3529E+00 | 3.9368E+00  | −8.0978E−01 |
| R5  | 9.9000E+01  | −2.5170E+00 | 5.4507E−01  | 2.2919E−01  | −1.0060E−01 |
| R6  | −6.2396E−01 | −7.5839E+00 | 5.6057E+00  | −2.3039E+00 | 4.0056E−01  |
| R7  | 2.9339E+00  | 5.4178E−02  | −7.7572E−02 | 3.2621E−02  | −4.7734E−03 |
| R8  | 1.9442E+01  | 1.5549E−02  | −7.2357E−03 | 1.2444E−03  | −7.8754E−05 |
| R9  | 4.1732E+00  | −7.4244E−03 | 1.1386E−03  | −9.5080E−05 | 3.2351E−06  |
| R10 | −5.9945E+00 | 3.4054E−03  | −4.5590E−04 | 3.3583E−05  | −1.0479E−06 |

Table 7 and Table 8 show the design data of the inflection point and stagnation point of the respective lenses in the camera optical lens 20.

TABLE 7

| | Number of inflection points | Inflection point position 1 | Inflection point position 2 | Inflection point position 3 |
|---|---|---|---|---|
| P1R1 | 0 | / | / | / |
| P1R2 | 1 | 0.545 | / | / |
| P2R1 | 1 | 0.235 | / | / |
| P2R2 | 1 | 0.355 | / | / |
| P3R1 | 1 | 0.735 | / | / |
| P3R2 | 1 | 0.905 | / | / |
| P4R1 | 2 | 0.605 | 1.365 | / |
| P4R2 | 2 | 0.695 | 1.475 | / |
| P5R1 | 3 | 0.255 | 1.275 | 1.985 |
| P5R2 | 1 | 0.485 | / | / |

TABLE 8

| | Number of stagnation points | Stagnation point position 1 |
|---|---|---|
| P1R1 | 0 | / |
| P1R2 | 1 | 0.745 |
| P2R1 | 1 | 0.395 |
| P2R2 | 1 | 0.585 |
| P3R1 | 1 | 0.885 |
| P3R2 | 1 | 1.085 |
| P4R1 | 1 | 0.895 |
| P4R2 | 1 | 1.015 |
| P5R1 | 1 | 0.445 |
| P5R2 | 1 | 1.115 |

In addition, the values corresponding to the various parameters and the parameters specified in the conditions in Embodiment 2 are listed in Table 13. It can be seen that the camera optical lens according to this embodiment satisfies the above-mentioned conditions.

Figure 6:
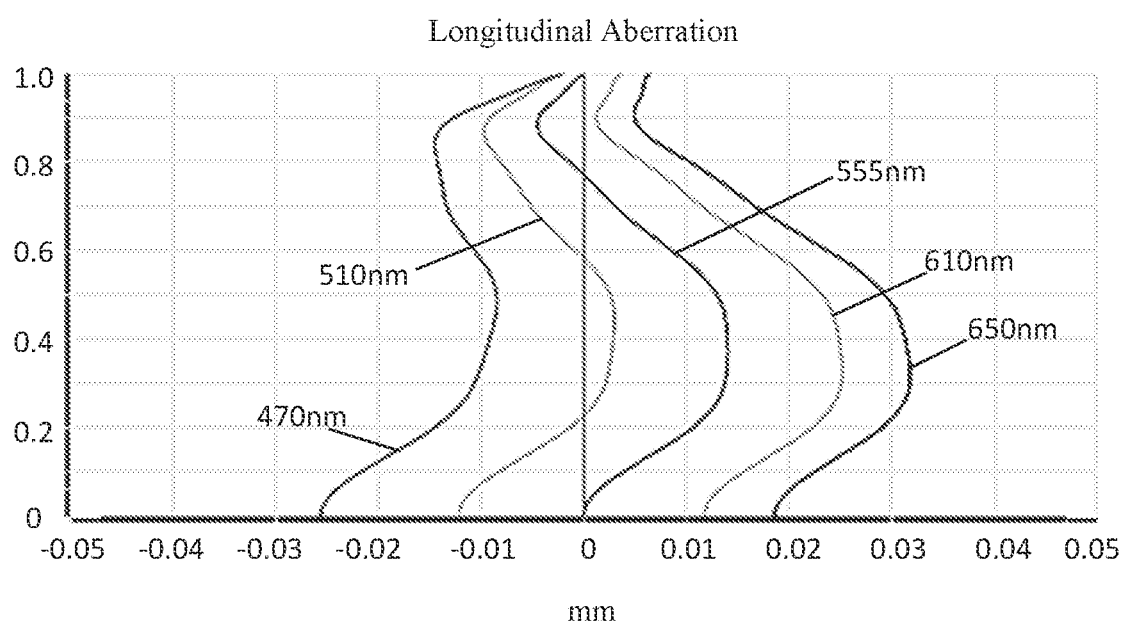
FIG. 6 is a schematic diagram of longitudinal aberration of the camera optical lens shown in FIG. 5.
Figure 7:
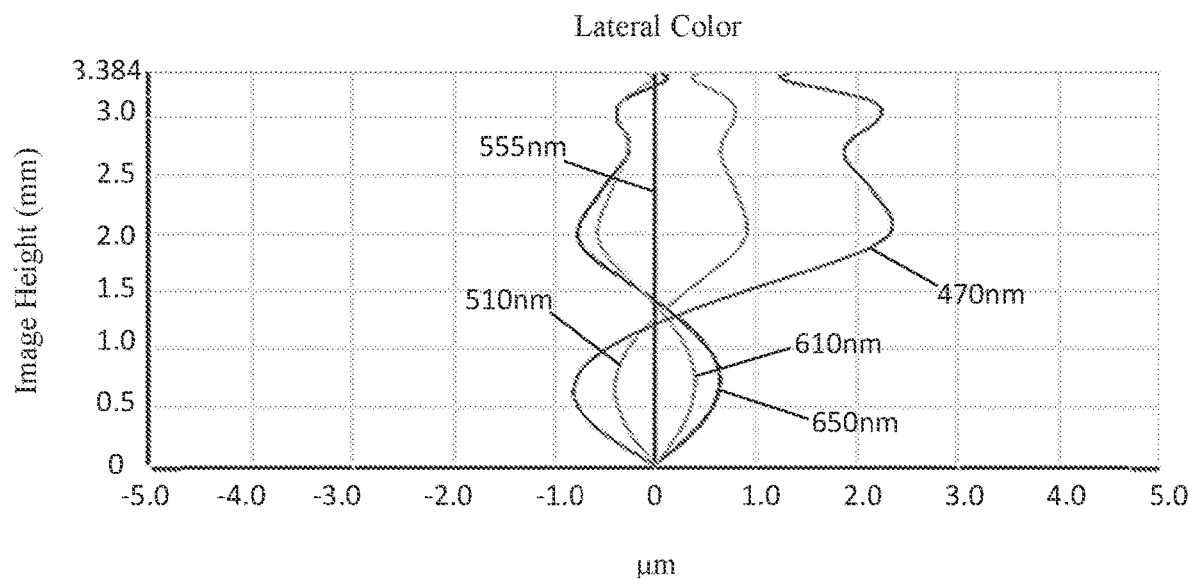
FIG. 7 is a schematic diagram of lateral color of the camera optical lens shown in FIG. 5.
Figure 8:
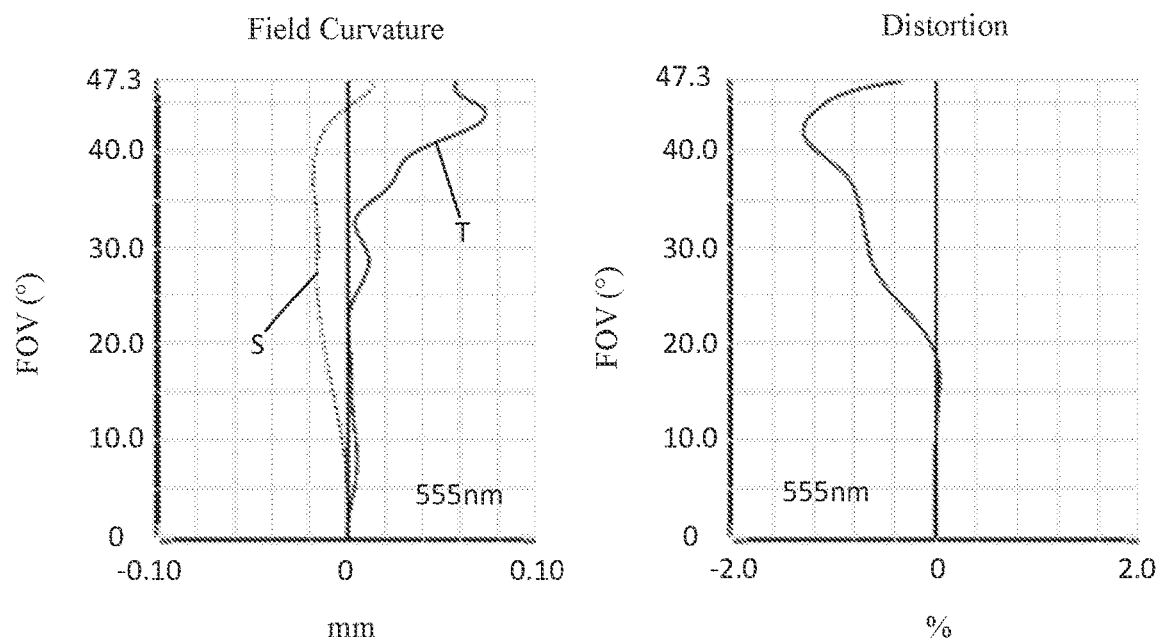
FIG. 8 is a schematic diagram of field curvature and distortion of the camera optical lens shown in FIG. 5.

FIG. 6 and FIG. 7 respectively show schematic diagrams of longitudinal aberration and lateral color of light having wavelengths of 650 nm, 610 nm, 555 nm, 510 nm and 470 nm after passing through the camera optical lens 20. FIG. 8 shows a schematic diagram of field curvature and distortion of light having a wavelength of 555 nm after passing through the camera optical lens 20. In FIG. 8, the field curvature S is the field curvature in a sagittal direction, and the field curvature T is the field curvature in a meridian direction.

In this embodiment, an entrance pupil diameter ENPD of the camera optical lens 20 is 1.485 mm, the full field of view image height IH is 3.384 mm, and the FOV in a diagonal direction is 94.60°, so that the camera optical lens 20 can meet the design requirements of a wide angle and ultra-thinness. The longitudinal and lateral color aberrations are fully corrected, and the camera optical lens 20 has excellent optical performance.

Embodiment 3

Figure 9:
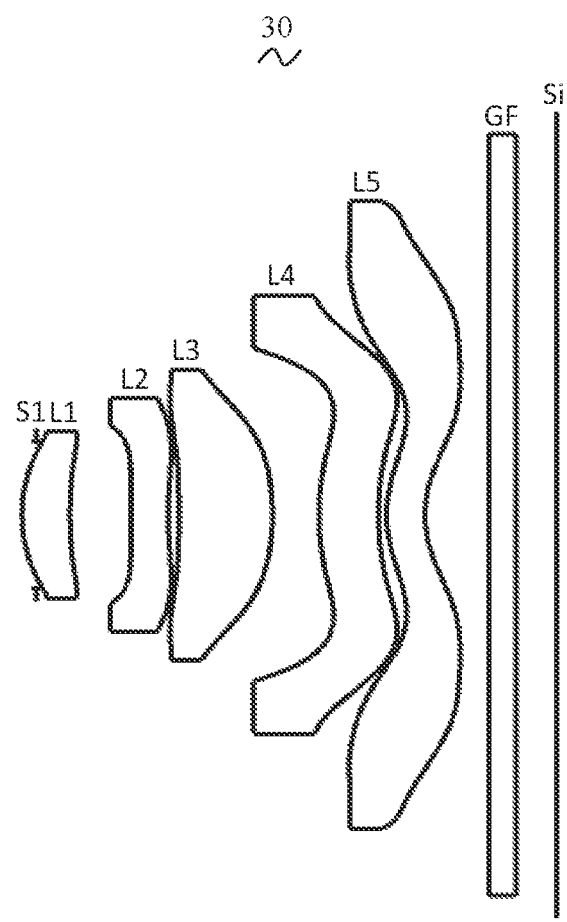
FIG. 9 is a schematic structural diagram of a camera optical lens according to Embodiment 3.

FIG. 9 is a schematic structural diagram of a camera optical lens 30 according to Embodiment 3. Embodiment 3 is basically the same as Embodiment 1. The representations of the symbols in the following tables are the same as those of Embodiment 1, and the same part thereof will not be repeated herein, and only the difference from Embodiment 1 is described in the following.

Table 9 and Table 10 show the design data of the camera optical lens 30 according to Embodiment 3 of the present invention.

TABLE 9

| | R | d | nd | vd |
|---|---|---|---|---|
| S1 | ∞ | d0 = −0.113 | | |
| R1 | 1.487 | d1 = 0.374 | nd1 1.5444 | v1 55.82 |
| R2 | 3.731 | d2 = 0.478 | | |
| R3 | 12.888 | d3 = 0.294 | nd2 1.6613 | v2 20.37 |
| R4 | 3.845 | d4 = 0.080 | | |
| R5 | −13.864 | d5 = 0.735 | nd3 1.6074 | v3 56.65 |
| R6 | −2.226 | d6 = 0.366 | | |
| R7 | 3.550 | d7 = 0.465 | nd4 1.6359 | v4 23.82 |
| R8 | 3.925 | d8 = 0.060 | | |
| R9 | 1.219 | d9 = 0.300 | nd5 1.6153 | v5 25.94 |
| R10 | 1.102 | d10 = 0.500 | | |
| R11 | ∞ | d11 = 0.210 | ndg 1.5168 | vg 64.17 |
| R12 | ∞ | d12 = 0.320 | | |

Table 10 shows the aspherical surface data of the respective lens in the camera optical lens 30 according to Embodiment 3 of the present invention.

TABLE 10

| | Cone coefficient | Aspherical coefficient | | | | |
|---|---|---|---|---|---|---|
| | k | A4 | A6 | A8 | A10 | A12 |
| R1 | 1.8615E+00 | −5.0680E−02 | −4.0454E−02 | −1.2324E−01 | −6.9745E−01 | 7.5625E+00 |
| R2 | 1.2737E+01 | −3.8839E−02 | 1.4519E−01 | −1.8107E+00 | 9.5442E+00 | −3.1175E+01 |
| R3 | −1.1614E+01 | −2.9810E−01 | 1.5538E−01 | 6.5753E−01 | −7.6221E+00 | 1.9930E+01 |
| R4 | −2.4697E+01 | −1.2439E−01 | −6.3306E−01 | 3.4434E+00 | −9.7797E+00 | 1.6876E+01 |
| R5 | 8.9829E+01 | 9.8638E−02 | −1.3863E+00 | 4.9253E+00 | −1.0061E+01 | 1.3243E+01 |
| R6 | 9.1337E−01 | 1.0486E−01 | −6.4237E−01 | 6.8412E−01 | 3.5725E−01 | −1.7624E+00 |
| R7 | 1.9060E+00 | 3.0174E−01 | −7.4310E−01 | 7.3988E−01 | −4.9849E−01 | 1.3963E−01 |
| R8 | 2.5931E+00 | 1.6674E−01 | −1.6957E−01 | −4.1707E−02 | 9.1106E−02 | −5.9306E−02 |
| R9 | −1.5447E+00 | −2.2784E−01 | −1.9859E−02 | 2.6064E−04 | 3.5071E−02 | −2.0556E−02 |
| R10 | −1.9201E+00 | 1.0943E−02 | −3.5292E−01 | 3.2861E−01 | −1.4717E−01 | 3.8175E−02 |

| | Cone coefficient | Aspherical coefficient | | | |
|---|---|---|---|---|---|
| | k | A14 | A16 | A18 | A20 |
| R1 | 1.8615E+00 | −3.3210E+01 | 7.3427E+01 | −8.2627E+01 | 3.6529E+01 |
| R2 | 1.2737E+01 | 5.9409E+01 | −6.3844E+01 | 3.3452E+01 | −6.3684E+00 |
| R3 | −1.1614E+01 | −1.7891E+01 | −1.9989E+01 | 5.2070E+01 | −2.9995E+01 |
| R4 | −2.4697E+01 | −1.8825E+01 | 1.3450E+01 | −5.6265E+00 | 1.0551E+00 |
| R5 | 8.9829E+01 | −1.1153E+01 | 5.7693E+00 | −1.6675E+00 | 2.0634E−01 |
| R6 | 9.1337E−01 | 2.0713E+00 | −1.1903E+00 | 3.4006E−01 | −3.8463E−02 |

TABLE 10-continued

| | | | | |
|---|---|---|---|---|
| R7 | 1.9060E+00 | 7.1512E−02 | −7.7689E−02 | 2.5366E−02 | −2.8886E−03 |
| R8 | 2.5931E+00 | 2.4312E−02 | −6.1214E−03 | 8.4053E−04 | −4.7989E−05 |
| R9 | −1.5447E+00 | 5.4240E−03 | −7.7023E−04 | 5.7490E−05 | −1.7794E−06 |
| R10 | −1.9201E+00 | −6.0260E−03 | 5.7158E−04 | −2.9943E−05 | 6.6480E−07 |

Table 11 and Table 12 show the design data of the inflection point and the stagnation point of each of the respective lenses in the camera optical lens 30.

TABLE 11

| | Number of inflection points | Inflection point position 1 | Inflection point position 2 | Inflection point position 3 |
|---|---|---|---|---|
| P1R1 | 0 | / | / | / |
| P1R2 | 1 | 0.585 | / | / |
| P2R1 | 1 | 0.155 | / | / |
| P2R2 | 2 | 0.315 | 0.985 | / |
| P3R1 | 1 | 0.765 | / | / |
| P3R2 | 1 | 1.035 | / | / |
| P4R1 | 2 | 0.615 | 1.485 | / |
| P4R2 | 2 | 0.735 | 1.595 | / |
| P5R1 | 3 | 0.505 | 1.425 | 2.445 |
| P5R2 | 3 | 0.595 | 2.315 | 2.645 |

TABLE 12

| | Number of stagnation points | Stagnation point position 1 | Stagnation point position 2 | Stagnation point position 3 |
|---|---|---|---|---|
| P1R1 | 0 | / | / | / |
| P1R2 | 1 | 0.745 | / | / |
| P2R1 | 1 | 0.265 | / | / |
| P2R2 | 1 | 0.565 | / | / |
| P3R1 | 1 | 1.055 | / | / |
| P3R2 | 0 | / | / | / |
| P4R1 | 1 | 0.915 | / | / |
| P4R2 | 1 | 1.035 | / | / |
| P5R1 | 3 | 0.895 | 2.285 | 2.515 |
| P5R2 | 1 | 1.235 | / | / |

In addition, the values corresponding to the various parameters and the parameters specified in the conditions in Embodiment 3 are listed in the following Table 13. It can be seen that the camera optical lens according to this embodiment satisfies the above-mentioned conditions.

Figure 10:
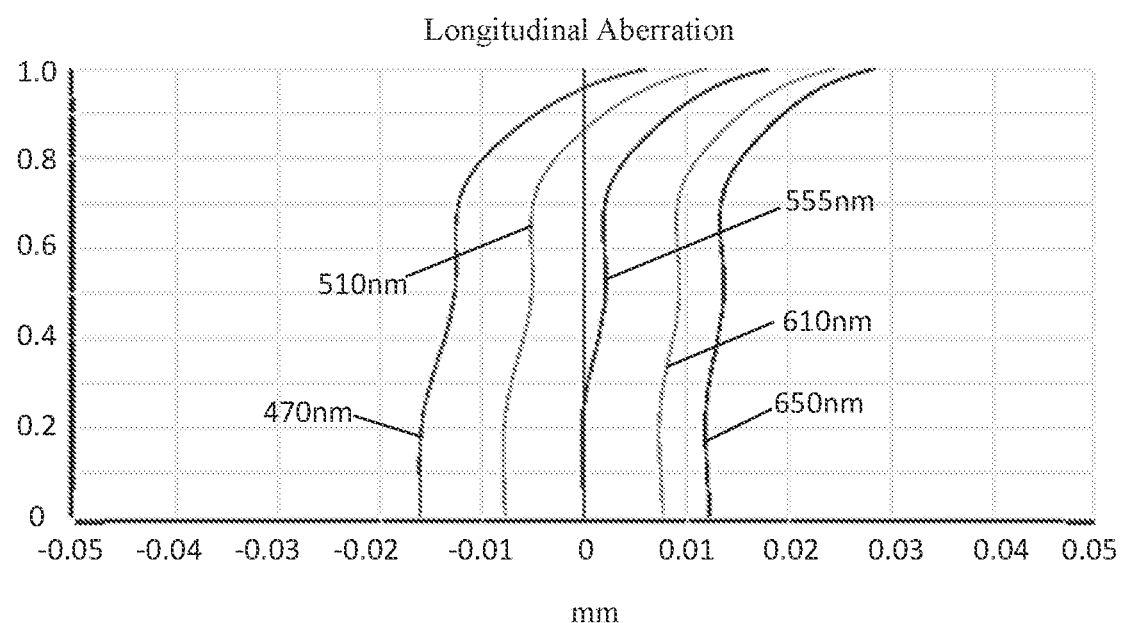
FIG. 10 is a schematic diagram of longitudinal aberration of the camera optical lens shown in FIG. 9.
Figure 11:
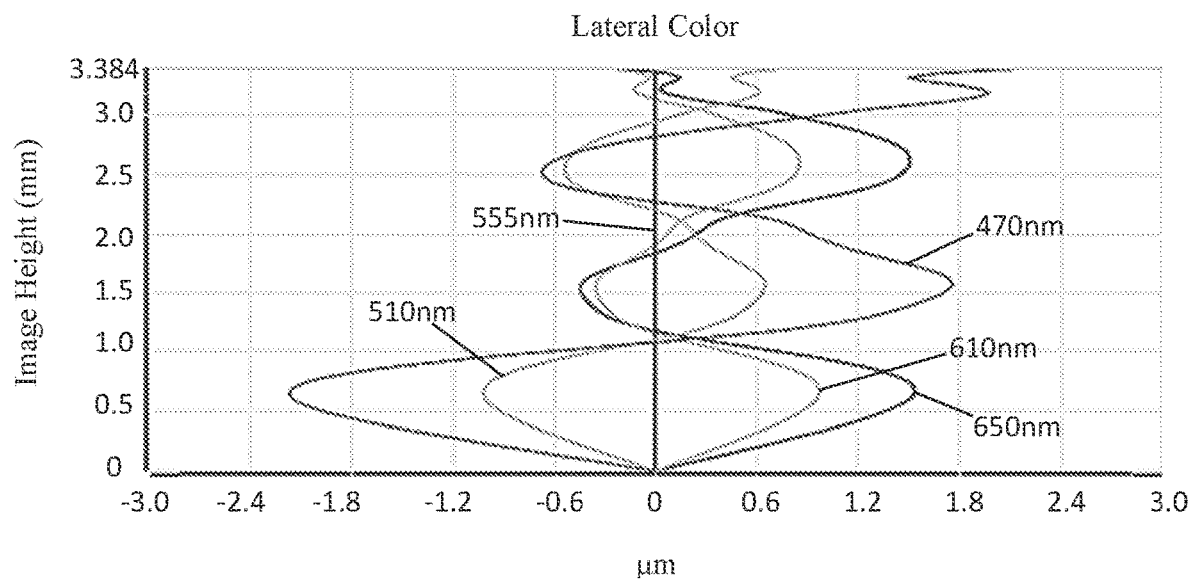
FIG. 11 is a schematic diagram of lateral color of the camera optical lens shown in FIG. 9.
Figure 12:
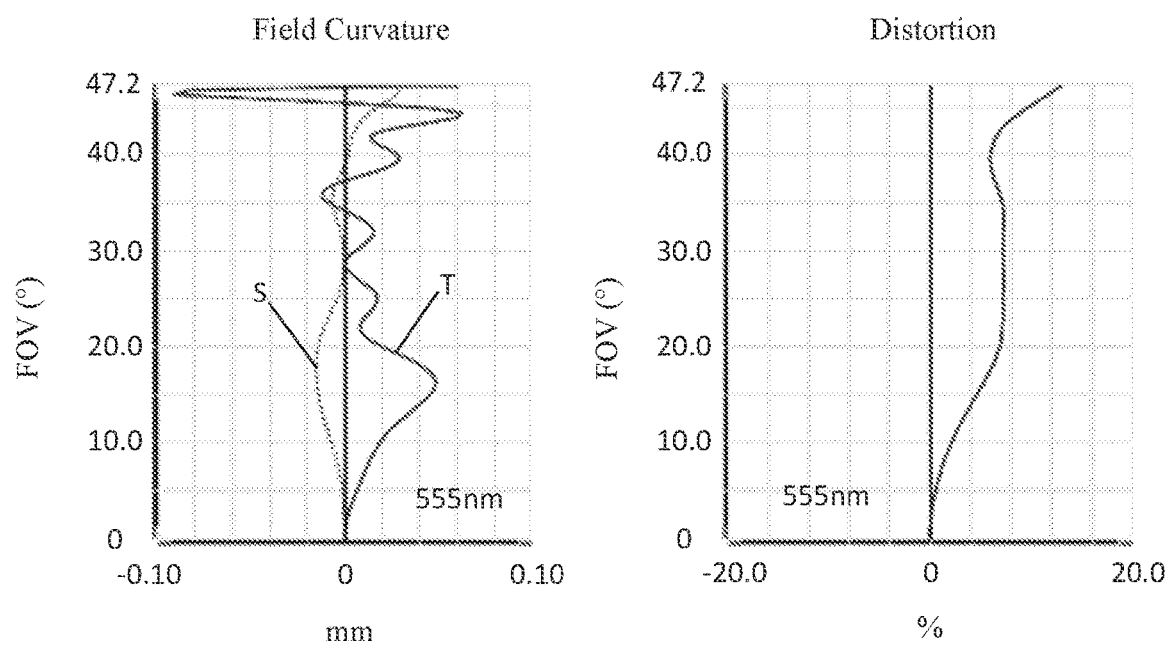
FIG. 12 is a schematic diagram of field curvature and distortion of the camera optical lens shown in FIG. 9.

FIG. 10 and FIG. 11 respectively show schematic diagrams of longitudinal aberration and lateral color of light having wavelengths of 650 nm, 610 nm, 555 nm, 510 nm and 470 nm after passing through the camera optical lens 30. FIG. 12 shows a schematic diagram of field curvature and distortion of light having a wavelength of 555 nm after passing through the camera optical lens 30. In FIG. 12, the field curvature S is the field curvature in a sagittal direction, and the field curvature T is the field curvature in a meridian direction.

In this embodiment, an entrance pupil diameter ENPD of the camera optical lens 30 is 1.323 mm, the full field of view image height IH is 3.384 mm, and the FOV in a diagonal direction is 94.40°, so that the camera optical lens 30 can meet the design requirements of a wide angle and ultra-thinness. The longitudinal and lateral color aberrations are fully corrected, and the camera optical lens 30 has excellent optical performance.

TABLE 13

| Parameters and conditions | Embodiment 1 | Embodiment 2 | Embodiment 3 |
|---|---|---|---|
| f2/f | −4.49 | −5.97 | −3.03 |
| (R7 + R8)/(R7 − R8) | −6.18 | −2.02 | −19.93 |
| d2/d4 | 2.92 | 1.63 | 5.98 |
| f | 3.075 | 3.088 | 2.751 |
| f1 | 4.935 | 5.768 | 4.275 |
| f2 | −13.796 | −18.423 | −8.323 |
| f3 | 5.578 | 4.001 | 4.250 |
| f4 | 19.686 | 7.199 | 39.115 |
| f5 | −8.076 | −2.701 | −1345.785 |
| FNO | 2.08 | 2.08 | 2.08 |
| TTL | 4.167 | 4.155 | 4.182 |
| FOV | 95.20° | 94.60° | 94.40° |
| IH | 3.384 | 3.384 | 3.384 |

The above description merely illustrates some embodiments of the present invention. It should be noted that those skilled in the art may make improvements without departing from a creative concept of the present invention, and all these improvements shall fall into a protection scope of the present invention.

What is claimed is:

1. A camera optical lens, comprising, from an object side to an image side:
   a first lens having a positive refractive power;
   a second lens having a negative refractive power;
   a third lens having a positive refractive power;
   a fourth lens having a positive refractive power; and
   a fifth lens having a negative refractive power,
   wherein an object side surface of the fourth lens L4 is a convex surface at a paraxial position, and an image side surface of the fourth lens L4 is a concave surface at a paraxial position,
   wherein the camera optical lens satisfies following conditions:

$-6.00 \leq f2/f \leq -3.00$;

$-20.00 \leq (R7+R8)/(R7-R8) \leq -2.00$; and $1.60 \leq d2/d4 \leq 6.00$, where f denotes a focal length of the camera optical lens, f2 denotes a focal length of the second lens, R7 denotes a central curvature radius of an object side surface of the fourth lens, R8 denotes a central curvature radius of an image side surface of the fourth lens, d2 denotes an on-axis distance from an image side surface of the first lens to an object side surface of the second lens, and d4 denotes an on-axis distance from an image side surface of the second lens to an object side surface of the third lens.

2. The camera optical lens as described in claim 1, further satisfying a following condition:

$1.50 \leq (R9+R10)/(R9-R10) \leq 20.00$, where R9 denotes a central curvature radius of an object side surface of the fifth lens, and R10 denotes a central curvature radius of an image side surface of the fifth lens.

3. The camera optical lens as described in claim 1, further satisfying following conditions:

$$0.78 \leq f1/f \leq 2.80;$$

$$-5.88 \leq (R1+R2)/(R1-R2) \leq -1.55; \text{ and}$$

$$0.04 \leq d1/TTL \leq 0.16,$$

where f1 denotes a focal length of the first lens, R1 denotes a central curvature radius of an object side surface of the first lens, R2 denotes a central curvature radius of the image side surface of the first lens, d1 denotes an on-axis thickness of the first lens, and TTL denotes a total optical length from the object side surface of the first lens to an image plane of the camera optical lens along an optic axis.

4. The camera optical lens as described in claim 1, further satisfying following conditions:

$$0.93 \leq (R3+R4)/(R3-R4) \leq 6.90; \text{ and}$$

$$0.03 \leq d3/TTL \leq 0.11,$$

where R3 denotes a central curvature radius of the object side surface of the second lens, R4 denotes a central curvature radius of the image side surface of the second lens, d3 denotes an on-axis thickness of the second lens, and TTL denotes a total optical length from an object side surface of the first lens to an image plane of the camera optical lens along an optic axis.

5. The camera optical lens as described in claim 1, further satisfying following conditions:

$$0.65 \leq f3/f \leq 2.72;$$

$$0.60 \leq (R5+R6)/(R5-R6) \leq 2.53; \text{ and}$$

$$0.06 \leq d5/TTL \leq 0.26,$$

where f3 denotes a focal length of the third lens, R5 denotes a central curvature radius of the object side surface of the third lens, R6 denotes a central curvature radius of an image side surface of the third lens, d5 denotes an on-axis thickness of the third lens, and TTL denotes a total optical length from an object side surface of the first lens to an image plane of the camera optical lens along an optic axis.

6. The camera optical lens as described in claim 1, further satisfying following conditions:

$$1.17 \leq f4/f \leq 21.33; \text{ and}$$

$$0.04 \leq d7/TTL \leq 0.17,$$

where f4 denotes a focal length of the fourth lens, d7 denotes an on-axis thickness of the fourth lens, and TTL denotes a total optical length from an object side surface of the first lens to an image plane of the camera optical lens along an optic axis.

7. The camera optical lens as described in claim 1, further satisfying following conditions:

$$-978.40 \leq f5/f \leq -0.58; \text{ and}$$

$$0.04 \leq d9/TTL \leq 0.15,$$

where f5 denotes a focal length of the fifth lens, d9 denotes an on-axis thickness of the fifth lens, and TTL denotes a total optical length from an object side surface of the first lens to an image plane of the camera optical lens along an optic axis.

8. The camera optical lens as described in claim 1, further satisfying a following condition:

$$TTL/IH \leq 1.25,$$

where IH denotes an image height of the camera optical lens, and TTL denotes a total optical length from an object side surface of the first lens to an image plane of the camera optical lens along an optic axis.

9. The camera optical lens as described in claim 1, further satisfying a following condition:

$$FOV \geq 94°,$$

where FOV denotes a field of view of the camera optical lens.

10. The camera optical lens as described in claim 1, further satisfying a following condition:

$$FNO \leq 2.10,$$

where FNO denotes an F number of the camera optical lens.

* * * * *